United States Patent [19]

Golumbic

[11] 4,028,160
[45] June 7, 1977

[54] PRECURED STRIP METHOD FOR REPAIRING FLEXIBLE MATERIALS

[75] Inventor: Harvey J. Golumbic, Fullerton, Calif.

[73] Assignee: Vinyl-Chem International, Inc., Glendale, Calif.

[22] Filed: Sept. 17, 1975

[21] Appl. No.: 614,129

[52] U.S. Cl. .................. 156/98; 156/306; 264/36; 264/293; 427/140; 425/12; 425/385; 428/63

[51] Int. Cl.² ..................... B32B 35/00

[58] Field of Search ......... 156/94, 98, 306; 427/140; 264/36, 293; 425/385, 12

[56] References Cited

UNITED STATES PATENTS

| | | | |
|---|---|---|---|
| 3,271,217 | 9/1966 | Marson | 156/98 |
| 3,513,048 | 5/1970 | Snyder | 156/98 |
| 3,620,865 | 11/1971 | Golumbic | 156/98 |
| 3,713,926 | 1/1973 | Speer | 156/98 |
| 3,804,685 | 4/1974 | Jacoby et al. | 156/98 |
| 3,810,801 | 5/1974 | Speer | 156/94 |

*Primary Examiner*—Edward G. Whitby
*Attorney, Agent, or Firm*—Christie, Parker & Hale

[57] ABSTRACT

Base vinyl material is readied for repair by preparing the edges of a hole to get a clean sharp periphery, and by cleaning the base material. A substantially non-heat shrinkable, precured, vinyl-welding compound having high tensile strength and low fusion point is laid in the hole so that it abuts against the periphery of the hole and then is fused to the base material by heat. The upper exposed surface of the repair is smoothed to present a continuous, uninterrupted surface with the base material. A hard and flexible graining tool is obtained from an impression of the base material. The graining tool is applied to the upper surface of the welding compound after it and the surrounding base material have been heated sufficiently to receive a grain impression.

12 Claims, 2 Drawing Figures

PRECURED STRIP METHOD FOR REPAIRING FLEXIBLE MATERIALS

BACKGROUND OF THE INVENTION

The present invention relates to a process for repairing flexible articles, and, more particularly, to a process for repairing vinyl base materials such as automotive upholstery and vinyl tops.

Vinyl materials have become extremely popular for use in automobiles, home furnishings and the like. The surface of vinyl materials can be textured to simulate almost any pattern desired. An example of this is simulated leather upholstery.

Vinyl materials can become damaged. Damage to the material by cigarette burns, knife cuts, tears, splits, and the like are examples.

U.S. Pat. No. 3,620,865 describes a process for repairing damaged flexible vinyl materials by applying successive, thin layers of a liquid vinyl-welding compound to a prepared hole in a damaged vinyl base material. Each layer is cured by application of heat. Before applying a successive layer, it is necessary to cool each cured layer to prevent premature curing of the bottom portion of the successive layer. Premature curing of the repair causes weakness due to variations in the strength of the repair across its thickness. Although this process has proven to be useful, it is not without disadvantages.

Among the disadvantages is that it is necessary to closely control the viscosity of the liquid vinyl-welding compound during repair. If the viscosity is too low the liquid will run and not stay in the hole being filled. If the compound is too thick, effective curing is impossible without damaging the vinyl base material because must of the heat applied to cure the welding compound will reach the base material surrounding the welding compound. On the other hand, if the heat is reduced to prevent damage to the vinyl base material, only the surface of a thick layer of weld compound will be cured. As a consequence, the weld compound must be layered into the vinyl base material and cured after each layer has been applied. Generally speaking, with most vinyl base material thicknesses, approximately four layers are required. Because many layers are required and each layer must be cooled before the subsequent layer can be applied, the repair process often is very time consuming, particularly when thick base material is being repaired.

Another disadvantage of repair with a liquid welding compound is that curing time depends upon may variables, such as the temperature of the heat source, humidity, ambient temperature, and thickness of the liquid layer. Because these variables are difficult, and in some cases impossible to control, it is impossible to predict how long a layer should be exposed to the heat source for complete cure. Therefore, some repairs are made with incompletely cured vinyl layers, with resulting loss in strength and wear resistance. The tendency in practice is to be conservative and overheat the welding compound, which is both time consuming and creates the risk of degrading the welding compound, the vinyl base material, or both.

Other prior art describes a process for repairing damaged flexible vinyl base materials by applying one layer of vinyl adhesive tape over the damaged hole in a vinyl base material and melting the vinyl into the hole and over the damaged vinyl base material. The disadvantage of this approach is that the vinyl tape material used shrinks when heat is applied so that a butt type joint between the vinyl tape and the edge of the hole cannot be used. Instead, a lap type joint must be used, with an unattractive lumpy and uneven appearance resulting.

SUMMARY OF THE INVENTION

The present invention envisions the use of one or more precured layers of a flexible, high strength, substantially non-heat shrinkable, and low fusion point vinyl-welding compound fused to a prepared area of a damaged vinyl article which, after fusing, is grained if desired.

In a specific form, the method of the present invention includes applying successive layers of a precured welding compound to a prepared hole in a vinyl base material to be repaired. An initial precured layer is applied over a backing material, for example, the metal roof on an automobile in the case of repair to a vinyl top, or sponge rubber in the case of a repair to an automobile seat. This layer is proximated to the edge of the hole and fused to the base material by heat to form a butt joint. In identical fashion an intermediate layer or layers and a final layer are integrated to the base material above the first layer. Before fusing the final layer, it is smoothed or leveled for continuity with the surface of the vinyl base material. After leveling, the last layer is fused to the vinyl base material by heat.

In one embodiment of the invention, all layers but the last layer is unpigmented and of a different color than the base material, and the last layer is pigmented to match the color of the base material. Because the initial and intermediate layers are not the same color as the base material, it is possible to observe if the precured material actually fuses into the vinyl base material, thereby allowing the operator to be certain that a strong weld is obtained.

In another embodiment of the invention, only one precured layer of thickness approximately equal to the thickness of the vinyl base material is used in order to quickly repair a damaged vinyl article. After preparing the vinyl base material the precured layer is applied over a backing material, smoothed or leveled to present a repair which is continuous with the surface of the vinyl base material, and then fused to the base material by heat.

When the vinyl base material has a grain texture, a grain texture may be applied to the welding compound using a graining tool having a die face with the required grain pattern. This tool is applied to the upper layer of the welding compound after it is fused to the vinyl base material. The upper layer is heated to soften the surface of the layer and adjacent vinyl material surrounding the layer for reception of the impression of the die. The die is applied to this heated area to feather the surface of the base material proximate the repair. The resulting surface is cooled before removal of the graining tool, as by cooling the graining tool with a wet cloth or sponge.

When the vinyl base material is pigmented, the repaired are of the vinyl base material may be colored with a vinyl coloring material. Alternatively, pigmented precured welding compound matching the vinyl base material may be used for effecting the repair, preferably only for the last layer.

The process of the present invention provides an expedient and cheap way of repairing vinyl flexible materials which have been damaged by ripping, tearing, burning or the like. Repairs made with this process typically take only about one fourth the time required for repairs made with liquid vinyl compounds because the curing and cooling steps are eliminated. The process produces a repair which is essentially identical in appearance to the vinyl base material being repaired. The repair is strong and has excellent wear resistance because the precured welding compound is optimumly cured in the controlled environment of a factory with special curing equipment rather than in the uncontrolled environment of the field.

These and other features, aspects, and advantages of the present invention will become more apparent from the following description, appended claims, and drawings.

DESCRIPTION OF THE PREFERRED EMBODIMENT

Figure 1:
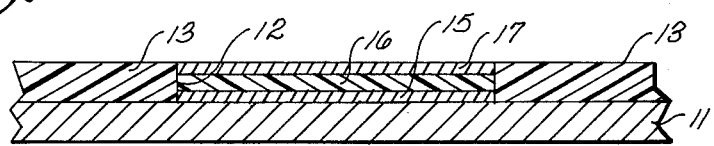
FIG. 1 depicts two layers of precured weld compound applied to a repaired hole of a flexible vinyl material such as the vinyl top on an automobile roof.
Figure 2:
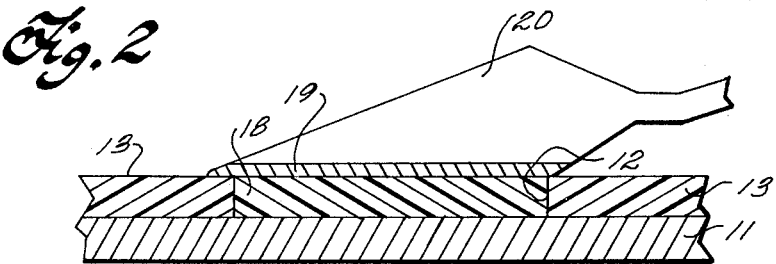
FIG. 2 is a view showing the finishing of a repair.

The process of the present invention contemplates the preparation of a damaged area in a vinyl base material by removing loose, damaged and frayed base material. This can be done with a sharp instrument such as a knife or razor blade. The object is to get a clean and sharp edge bounded on one side by the area to be repaired and on the other with undamaged vinyl. In the event that the repair is to a razor-type cut, the cut or slit is opened by cutting a little base material away to develop a wider slit, for example, about a one sixteenth of an inch. This provides room for precured vinyl welding compound, hereinafter described, and ensures a strong fusion bond between the welding compound and the base material being repaired.

Further preparation of the joint may be required where the vinyl material is glued to a substrate such as a car roof. Glue adversely affects the vinyl-welding material by causing it to crack. Therefore, any regluing which must be done to the vinyl base material should be done without allowing glue to get onto the substrate over which the vinyl-welding material is to be applied or on the peripherial edges of the hole.

In order to obtain satisfactory fusion between the vinyl-welding compound and the base material being repaired, it is necessary that the vinyl base material defining the repair hole or slit be thoroughly cleaned. This may be done with any good quality solvent such as toluol which will remove grease and the like to present a clean vinyl surface without leaving a residue. In addition to grease removal, it is preferred that a mild vinyl solvent be used to clean a small film of vinyl off the area of the base material bounding the repair hole to be sure that all foreign matter is removed. The removal of foreign matter from the surface of the vinyl base material bounding the hole is necessary if edge lifting is to be avoided.

After the area of the surface of regluing vinyl material to be repaired has been thoroughly cleaned, it must dry. Drying may be done by wiping the solvent cleaners away and by the application of heat as from a commercially peripherial heat gun.

The vinyl-welding compound used in repairing a damaged vinyl article is a vinyl compound having a high tensile strength relative to the vinyl base material but with a fusion point compatible with the base material. The requirement of a low fusion point is necessary to prevent damage to the base material during the curing of the welding compound. The following table shows satisfactory ingredients for a welding compound. The amounts shown are for a 90-gallon batch.

TABLE 1

|  |  | Parts by Weight |
|---|---|---|
| Diamond PVC 7401 | 360 lbs. | 0.445 |
| Diamond PVC 71 | 120 lbs. | 0.150 |
| Diisodecyl Phalate (DIDP) | 320 lbs. | 0.395 |
| Ferro 1777 | 3,600 g.ms | 0.010 |

Diamond PVC 7401 has a low fusion temperature and relatively low tensile strength. The addition of Diamond PVC 71 to PVC 7401 increases tensile strength but also increases the fusion temperature. Diamond PVC 7401 is a copolymer of vinyl chloride and polyvinyl acetate manufactured by the dispersion method. Diamond PVC 71 is a homopolymer of polyvinyl chloride manufactured by the dispersion method which has a fusion temperature of from between 325° to 350° F. The balance shown in the table has proven highly satisfactory in accommodating both the requisites of tensile strength and fusion temperature. The diisodecyl phalate is used to increase the flexibility of the welding compound. If too much of this plasticizer is used, the welding compound loses desirable tensile strength. The ferro 1777 is a stabilizer. It is a calcium-zinc organic inhibitor. The composition set forth above is a thermoplastic and thermosetting material which must be cured.

The liquid welding compound is cured in various thicknesses at temperatures from 280° to 375° F. by preheating two metal plates to the desired temperature and placing liquid welding compound between the plates. One of the two plates has projections whose height is approximately equal to the desired thickness of the cured layer, usually from about 0.010 to about 0.050 inches. Preferably, curing heat is provided by electric coils in one or both of the plates.

The process of the present invention contemplates that one or more layers of the precured weld compound be placed into the hole in the vinyl base material and fused to the edge of the vinyl base material surrounding the hole with application of heat to give a butt joint. One precured layer whose thickness is approximately equal to that of the vinyl base material is used. Alternatively, successive layers of precured material whose combined thickness approximates that of the vinyl base material are used.

The repair must be backed in order to prevent the compound from sagging through the hole. Normally the backing is provided by seat cushion material, or in the case of vinyl tops, the steel automobile roof. If backing is not so provided, then some form of backing must be used. Thus, when the sponge rubber used in any automobile upholstery applications is split in the area to be fixed, sponge rubber split is filled with, for example, cotton.

Another consideration should be observed if grain flattening of the vinyl base material is to be avoided in situations where the substrate absorbs considerable amounts of the heat applied during fusing. This situation occurs, for example, in vinyl top repairs where the steel substrate absorbs and retains heat applied with a heat gun. This applied heat causes the grain of the base material to flatten. To prevent this, an insulating layer of, say cardboard, should be placed between the metal and welding compound.

The application of precured welding compounding to holes in a vinyl material is schematically shown in the Figures. The Figures illustrate a substrate or backing 11, for example a car roof, a prepared hole 12, and a vinyl base material 13 overlying the substrate bounding hole 12. An initial precured layer 15 of welding compound is laid into the hole. This layer is proximated to the edge of the hole to butt against the vinyl base material surrounding the hole. The layer is fused with the vinyl base material by the application of heat through a device such as a heat gun. Therefore the demarcation between the precured layer 15 and the vinyl base material 13 is not actually present.

In identical fashion, an intermediate layer 16 is applied to the hole and fused to the surrounding vinyl base material. Because the vinyl welding compound is precured, it is not necessary to wait until the initial layer 15 cools to prevent premature curing before applying the intermediate layer 16. This allows a repair to be made quickly.

In identical fashion, additional intermediate layers (not shown) are applied to the hole to build up the repair until its thickness differs from the thickness of the vinyl base material by about the thickness of one layer of precured welding compound.

As shown in FIG. 1, the combined thicknesses of layers 15 and 16 is less than the thickness of the vinyl base material 13. Thus, a final precured layer 17 is needed so that the surface of the repair will be even with the surface of the base material. Although using more than one precured layer to effect the repair takes longer than using only one precured layer, there is an advantage to be realized through the use of more than one layer since the top layer can be pigmented to match the vinyl base material, and thus the bottom and intermediate layers may be clear or colored different from the color of the base material. Because the bottom and intermediate layers are not the same color as the base material it is possible to observe if the precured material actually fuses into the vinyl base material, thereby allowing the operator to be certain that a strong weld is obtained. When only one layer is used to repair the damaged vinyl base material, the thickness of the layer necessarily approximates the thickness of the vinyl base material.

The final layer 17 is applied just as the initial precured layer 15 is applied, but it must be smoothened or leveled flush with the level of the upper surface of the vinyl base material before heating. After it is leveled, it is fused by the application of heat to the vinyl base material. The leveled or smoothened repair is indicated by reference numeral 18. Again it should be emphasized that the repair material after curing is fused with the vinyl base material, and therefore the illustrated distinctive boundary between the two is not in fact present.

The color of the repair may be made to match that of the vinyl base material by coloring it with a vinyl paint, if so desired. Alternately and preferably pigment is added to the welding compound used for the last layer before it is cured so that upon cure the repair will match the vinyl base material.

Generally, the grain or surface texture of the vinyl base material must be duplicated in the exposed surface of the cured welding compound. This is done by a graining tool 19 which is applied to a heated and softened surface of the weld compound and adjacent vinyl base material.

The graining tool is made with a relatively hard but yet flexible material which has a die surface with the impression of the grain pattern or surface texture desired. The graining tool may be fabricated from the ingredients and in the proportions listed below in table II.

TABLE II

| | |
|---|---|
| Reichold polyester resin 32-345 | 450 lbs. |
| Reichold polyester resin 31-851 | 50 lbs. |
| Calcium carbonate | 400 lbs. |
| Talc | 100 lbs. |

The polyester resin 32-345 has a very good curing rate and is dry to the touch after it cures, due to the presence of metallic drying agents. It is resilient but not flexible, that is, it is stiff. The polyester resin 31-851 is added to enhance flexibility and therefore reduces the stiffness which would result from the exclusive use of the polyester resin 32-345. These polyesters do not adhere to the vinyl material of the repair and base material. Both resins are a semisaturated polymer where some of the saturated adipic acids have been replaced with some phthalic anhydrides and some of the propylene glycols have been replaced by the more flexible diethylene glycol. Both resins also have a styrene monomer which forms a polyester monomer with an acid value of from between 20 to 25. Resin 31-851 has more diethylene glycol than resin 32-345 to add flexibility.

The calcium carbonate is an extender to reduce the cost of the compound used in fabricating the grain-on tools. The talc has absorption qualities that are used for the purpose of adjusting viscosity.

A mold release of, say, silicone is placed over the vinyl base material. The grain-on compound just described is poured on a flat, nonporous surface and mixed with an activator. The activated grain-on compound is then removed from the surface and applied over the area of the vinyl base material which has been coated with the silicone mold release. The activated grain-on compound is then leveled as by a spatula or stick.

Preferably, a backing of a second piece of vinyl having the grain or surface texture of the piece being repaired is placed on the grain-on compound before it sets up. The canvas or fabric side of this backing vinyl piece contacts the grain-on compound in order to show the grain texture. Pressure is applied to the grain-on compound and backing strip while they are still on the vinyl base material, as by a board or small weight. After a period of time, the grain-on compound will set and harden. It may then be peeled off the vinyl base material. The resulting grain-on tool has a die face with the impression of the grain or surface texture of the vinyl base material.

The grain-on tool may be registered or indexed with a repetitive pattern of the vinyl base material. This is done by aligning the backing vinyl piece with an identical pattern on the base material before the grain-on compound has set. The backing vinyl piece can then be indexed with the area of the vinyl base material surrounding the repair.

A grain is applied by the graining tool by softening the surface of the upper layer of weld compound and the adjacent surface of the vinyl base material and then applying the grain-on tool 19 over the upper surface and adjacent surface of the vinyl base material under pressure exerted with a pallet knife 20 or similar device. After a small period of time, for example, 5 seconds, and after cooling the grain-on tool as by a wet cloth or sponge, the tool is removed. Color may be applied to the repaired area through a vinyl color spray.

The present invention has been described with reference to a preferred embodiment. The spirit and scope of the appended claims should not, however necessarily be limited to this description.

What is claimed is:

1. A process for repairing a damaged area in a vinyl base material comprising:
   a. preparing an area to be repaired in the vinyl base material by making a hole with a sharp, clean edge;
   b. cleaning the surface of the base material adjacent to the hole with a liquid cleaner;
   c. drying the cleaned area by removing the liquid cleaner from the cleaned area;
   d. applying at least one preformed layer of a substantially non-heat shrinking, precured thermoplastic vinyl-welding compound into the hole, each layer having a fusion temperature about equal to that of the vinyl base material and a high tensile strength relative to the vinyl base material, each layer having substantially the same shape and peripheral dimensions as the hole so that the periphery of each such layer butts against the periphery of the hole; and
   e. fusing each layer to the vinyl base material by the application of heat to the vinyl base material.

2. The process as claimed in claim 1 including the additional step of graining the surface of the last layer by:
   a. heating the surface of the last layer to soften it;
   b. applying a graining tool having a grain pattern of the vinyl base material and a die face thereof to the softened surface with the die face on such softened surface;
   c. maintaining the graining tool on the softened surface under slight pressure to obtain a grain therein; and
   d. cooling the grained softened surface while maintaining the slight pressure with the graining tool to allow the grained softened surface to harden.

3. The process claimed in claim 1 wherein the thermoplastic welding compound comprises, in parts by weight, about 0.445 parts of a copolymer of vinyl chloride and polyvinyl acetate, about 0.150 parts of a homopolymer of polyvinyl chloride having a fusion temperature of from between about 325° to 350° F., about 0.395 parts diisodecyl phalate, and minor amounts of a stabilizer.

4. The process claimed in claim 2 wherein the thermoplastic welding compound comprises, in parts by weight, about 0.445 parts of a copolymer of vinyl chloride and polyvinyl acetate, about 0.150 parts of a homopolymer of polyvinyl chloride having a fusion temperature of from between about 325° to 350° F., about 0.395 parts diisodecyl phalate, and minor amounts of a stabilizer.

5. The process claimed in claim 2 wherein the graining tool has a backing with the grain pattern of the vinyl base material, the die face grain pattern is in register with the grain pattern on the backing, and the graining tool is applied to the softened area with the grain pattern on the backing in index with the grain pattern of the vinyl base material.

6. The process claimed in claim 2 wherein the graining tool has a backing with the grain pattern of the vinyl base material.

7. The process claimed in claim 1 wherein the color of the last precured layer at least approximately matches the color of the vinyl base material.

8. A process for repairing a damaged area in a vinyl base material comprising:
   a. preparing an open hole in an area to be repaired in the vinyl base material to obtain a sharp, clean edge bounding the hole;
   b. cleaning the surface of the base material adjacent to the hole with a liquid cleaner;
   c. drying the cleaned area by removing the liquid cleaner;
   d. laying in the hole a precured, preformed layer of vinyl-welding compound of thickness about equal to the thickness of the vinyl base material, wherein the layer has substantially the same geometry as the hole and is formed from a substantially non-heat shrinking liquid thermoplastic vinyl-welding compound having a fusion temperature about equal to that of the vinyl base material and a high tensile strength relative to the vinyl base material into the hole; and
   e. fusing the layer to the vinyl base material by the application of heat to the vinyl base material after the layer has been laid in the hole.

9. The process claimed in claim 8 including the additional step of graining the surface of the precured layer by:
   a. heating the surface of the precured surface to soften it;
   b. applying a graining tool having the graining pattern of the vinyl base material in die face thereof to the softened surface with the die face on such softened surface;
   c. maintaining the graining tool on the softened surface under a slight pressure to obtain a grain therein; and
   d. cooling the grained softened surface while maintaining the slight pressure with the graining tool to allow the grained softened surface to harden.

10. The process claimed in claim 8 wherein the thermoplastic welding compound comprises, in parts by weight, about 0.445 parts of a copolymer of vinyl chloride and polyvinyl acetate, about 0.150 parts of a homopolymer of polyvinyl chloride having a fusion temperature of from between about 325° to 350° F., about 0.395 parts diisodecyl phalate, and minor amounts of a stabilizer.

11. The process claimed in claim 9 wherein the graining tool has a backing with the grain pattern of the vinyl base material.

12. The process claimed in claim 8 wherein the color of the last precured layer at least approximately matches the color of the vinyl base material.

* * * * *

UNITED STATES PATENT AND TRADEMARK OFFICE
CERTIFICATE OF CORRECTION

PATENT NO. : 4,028,160
DATED : June 7, 1977
INVENTOR(S) : Harvey J. Golumbic

It is certified that error appears in the above-identified patent and that said Letters Patent are hereby corrected as shown below:

Column 1, line 36, "must" should read --much--. Column 2, line 61, "are" should read --area--. Column 3, line 62, delete "regluing" and insert --the--; line 66, delete "peripherial" and insert --available--. Column 4, line 23, after "between" insert --about--.

Signed and Sealed this

Fourth Day of October 1977

[SEAL]

Attest:

RUTH C. MASON
Attesting Officer

LUTRELLE F. PARKER
Acting Commissioner of Patents and Trademarks